United States Patent
Wolff et al.

(10) Patent No.: US 10,641,624 B2
(45) Date of Patent: May 5, 2020

(54) INTRINSICALLY-SAFE, EXPLOSION-PROOF ENCODER

(71) Applicant: Nidec Motor Corporation, St. Louis, MO (US)

(72) Inventors: Leslie Wolff, Goleta, CA (US); Glenn Siracki, Burton, OH (US); Owen Patton, Broadview Heights, OH (US)

(73) Assignee: Nidec Motor Corporation, St. Louis, MO (US)

( * ) Notice: Subject to any disclaimer, the term of this patent is extended or adjusted under 35 U.S.C. 154(b) by 274 days.

(21) Appl. No.: 15/691,429

(22) Filed: Aug. 30, 2017

(65) Prior Publication Data

US 2019/0063964 A1 Feb. 28, 2019

(51) Int. Cl.
  *G01D 11/24* (2006.01)
  *G01D 5/245* (2006.01)
  *E21B 47/01* (2012.01)
  *H01R 13/52* (2006.01)

(52) U.S. Cl.
  CPC .......... *G01D 11/245* (2013.01); *G01D 5/245* (2013.01); *E21B 47/011* (2013.01); *H01R 13/52* (2013.01)

(58) Field of Classification Search
  CPC .. G01D 5/24423; G01D 11/24; G01D 11/245; E21B 47/01; E21B 47/011; H01R 13/52; H01R 13/527
  USPC .......................................................... 73/431
  See application file for complete search history.

(56) References Cited

U.S. PATENT DOCUMENTS

| | | | | |
|---|---|---|---|---|
| 5,954,526 A | * | 9/1999 | Smith | G01L 19/14 439/136 |
| 6,062,095 A | * | 5/2000 | Mulrooney | G01D 11/24 73/204.22 |
| 6,109,979 A | | 8/2000 | Garnett | |
| 6,331,674 B1 | * | 12/2001 | Zolock | G01F 1/8409 174/60 |
| 2009/0317259 A1 | * | 12/2009 | Burch, Jr. | F04B 49/025 417/1 |
| 2013/0140929 A1 | | 6/2013 | Lee et al. | |
| 2014/0346900 A1 | | 11/2014 | Bobelis et al. | |
| 2016/0128213 A1 | | 5/2016 | Wohrstein et al. | |
| 2016/0277048 A1 | | 9/2016 | Kramer et al. | |

* cited by examiner

*Primary Examiner* — Benjamin R Schmitt
(74) *Attorney, Agent, or Firm* — Stinson LLP

(57) ABSTRACT

An encoder includes a housing including a first set of one or more sidewalls defining a first zone, a second set of one or more sidewalls defining a second zone, and a protection partition having a first surface oriented toward the first zone and a second surface oriented toward the second zone. The protection partition has a sensor opening defined therethrough between the first zone and the second zone. A board stack assembly having a plurality of elevations is positioned such that an interface device and a first portion of a protective wire feedthrough are in the first zone and a second portion of the protective wire feedthrough extends through the sensor opening between the first zone and the second zone. The protective wire feedthrough is coupleable to a sensor device in the second zone. A cover engages the first set of one or more sidewalls to seal the first zone from an ambient environment.

19 Claims, 8 Drawing Sheets

INTRINSICALLY-SAFE, EXPLOSION-PROOF ENCODER

BACKGROUND

At least some known position sensor systems usable in hazardous environments include sensors housed in heavy pressure housing. Such known configuration requires rotating shafts to be manufactured with extremely tight tolerances, which may be tedious, time-consuming, and/or expensive. Moreover, such known configuration results in limited shock and vibration performance, rending sensors with modular construction unusable with known explosion-proof position sensors. Additionally, known position sensors with integral bearings have decreased durability, lack diagnostic capabilities, and/or programmability. Other known position sensor systems usable in hazardous environments include sensors housed in undesirably large housing.

SUMMARY

Examples of the disclosure enable an encoder to be usable in hazardous environments in an efficient, effective, and safe manner. An intrinsically-safe, explosion-proof encoder includes a housing including a plurality of sidewalls and a protection partition. The sidewalls include a first set of one or more sidewalls defining a first zone and a second set of one or more sidewalls defining a second zone. The protection partition has a first surface oriented toward the first zone and a second surface oriented toward the second zone. The protection partition has a sensor opening defined therethrough between the first zone and the second zone. The encoder includes a board stack assembly including an interface device and a protective wire feedthrough at a plurality of elevations. The board stack assembly is positionable such that the interface device and a first portion of the protective wire feedthrough are in the first zone and a second portion of the protective wire feedthrough extends through the sensor opening between the first zone and the second zone. The protective wire feedthrough is coupleable to a sensor device in the second zone. The encoder includes a cover configured to engage the first set of one or more sidewalls such that the cover seals the first zone from an ambient environment.

In another aspect, a position sensor system is provided. The position sensor system includes a position sensor and an encoder communicatively coupleable to the position sensor. The encoder includes a housing defining a first zone and a second zone, a board stack assembly in the first zone, and a cover configured to seal the first zone from an ambient environment. The board stack assembly has a plurality of elevations.

In yet another aspect, a method is provided for providing an intrinsically-safe encoder for use with one or more sensor devices. The method includes assembling a board stack assembly including an interface device and a protective wire feedthrough at a plurality of elevations, and positioning the board stack assembly such that the interface device and a first portion of the protective wire feedthrough are in a first zone defined by a housing and a second portion of the protective wire feedthrough extends between the first zone and a second zone defined by the housing. The housing includes a protection partition delineating the first zone from the second zone. The method includes coupling a cover to the housing such that the cover seals the first zone from an ambient environment, and coupling the protective wire feedthrough to the sensor devices in the second zone.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

The subject matter described herein relates generally to sensor systems and, more specifically, to intrinsically-safe, explosion-proof encoders. Examples of the disclosure may be used to detect one or more parameters associated with a monitored object, such as a rotor. The examples described herein include a protection partition that enables an object to be monitored in a hazardous environment, such as an area where explosive gas, dust, or fibers exist. Additionally, the examples described herein include an energy-limiting apparatus and a protective wire feedthrough that limits an electrical energy transmitted into the hazardous environment. Use of the energy-limiting apparatus and its associated circuitry reduces a need for an infallible ground, and the protective wire feedthrough enables energy and/or communication transmitted through the protection partition to be controlled or managed. In this manner, examples of the disclosure enable one or more objects to be monitored for a wide variety of applications including, but not limited to, oil and gas drilling, oil and gas well reworking, tracking, chemical processing, painting, explosives manufacturing, coal handling, coal mining, grain handling, and grain storage.

Figure 1:
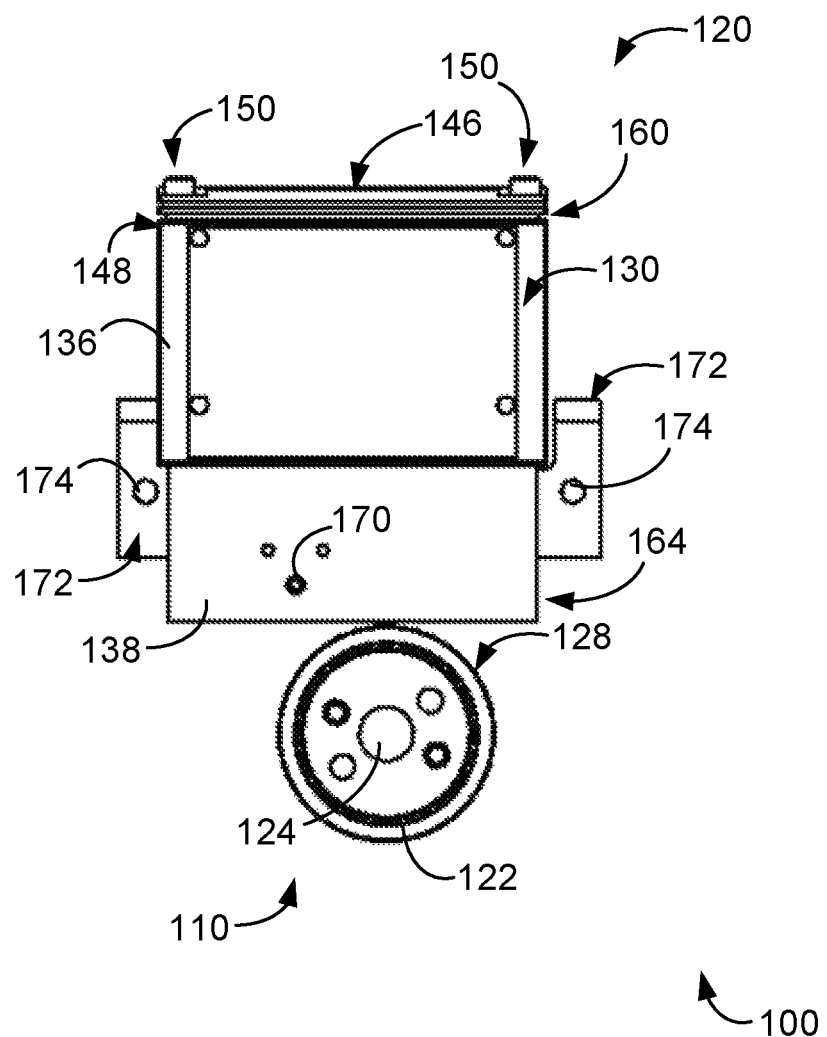
FIG. 1 is a side view of an example position sensor system.
Figure 2:
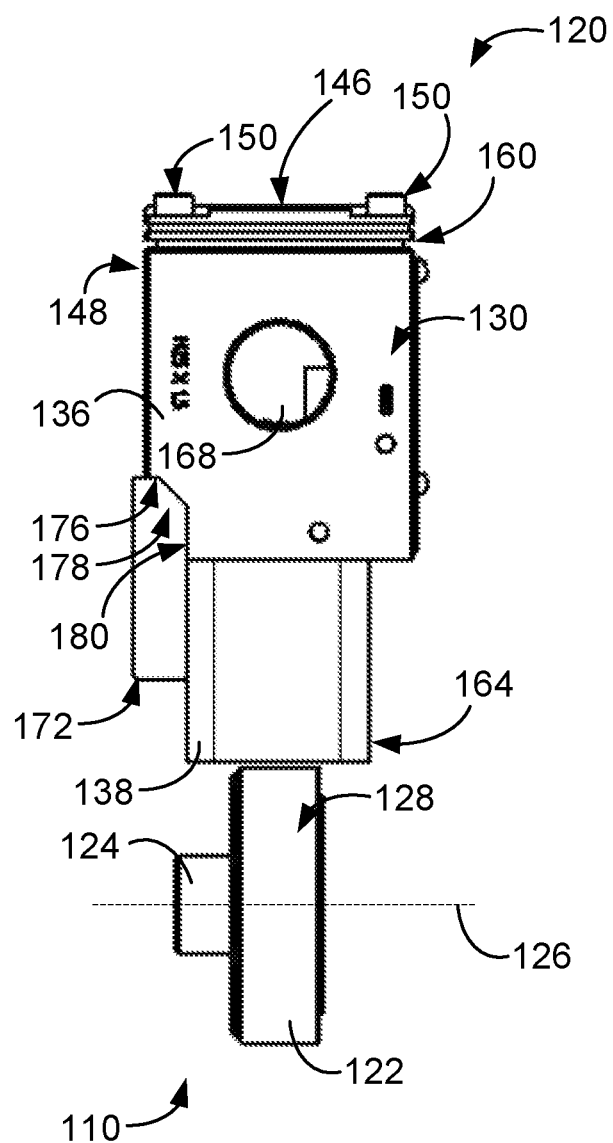
FIG. 2 is an end view of the position sensor system shown in FIG. 1.
Figure 3:
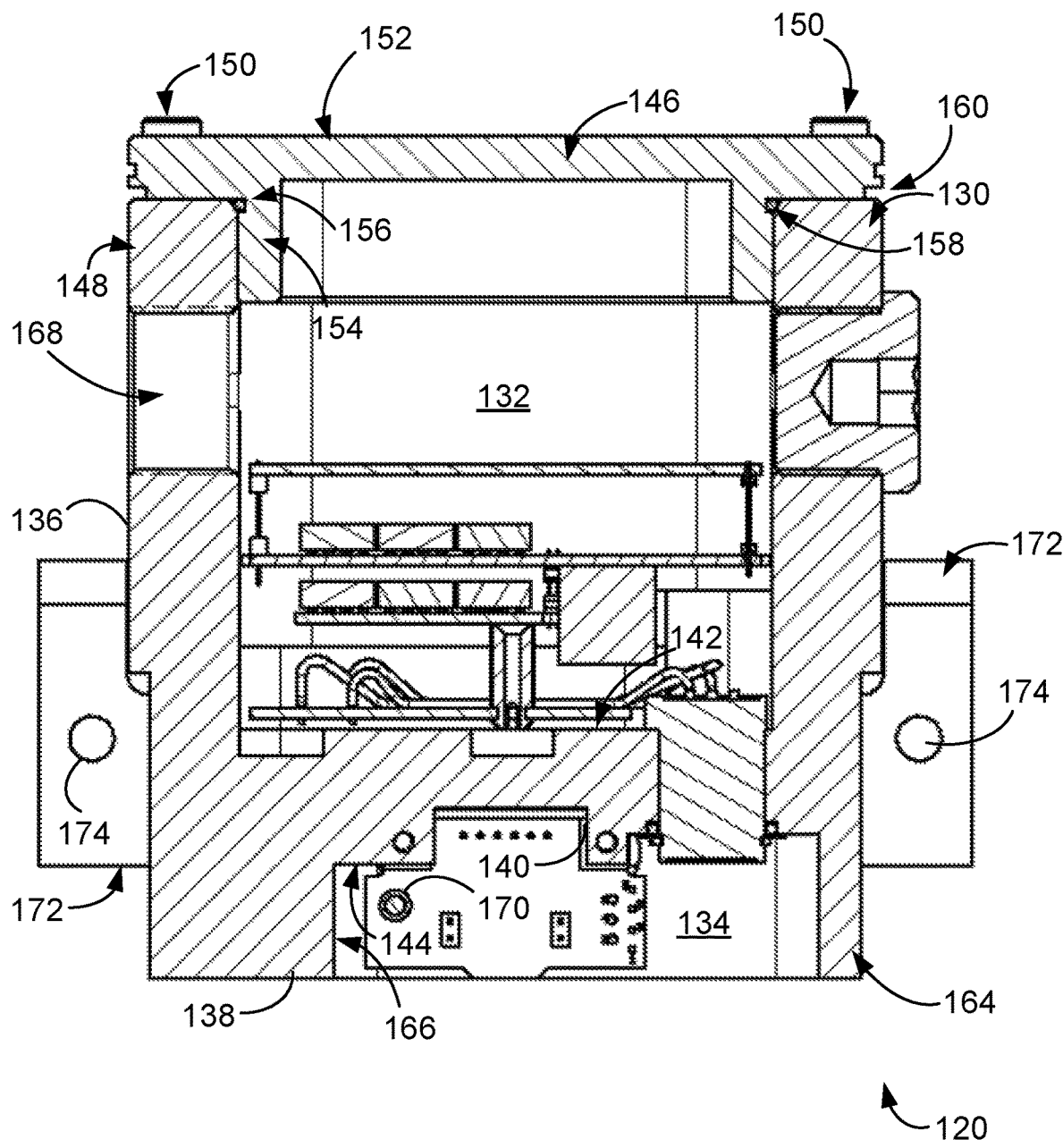
FIG. 3 is a cross-sectional view of an example explosion-proof encoder that may be used with a position sensor system, such as the position sensor system shown in FIG. 1.
Figure 4:
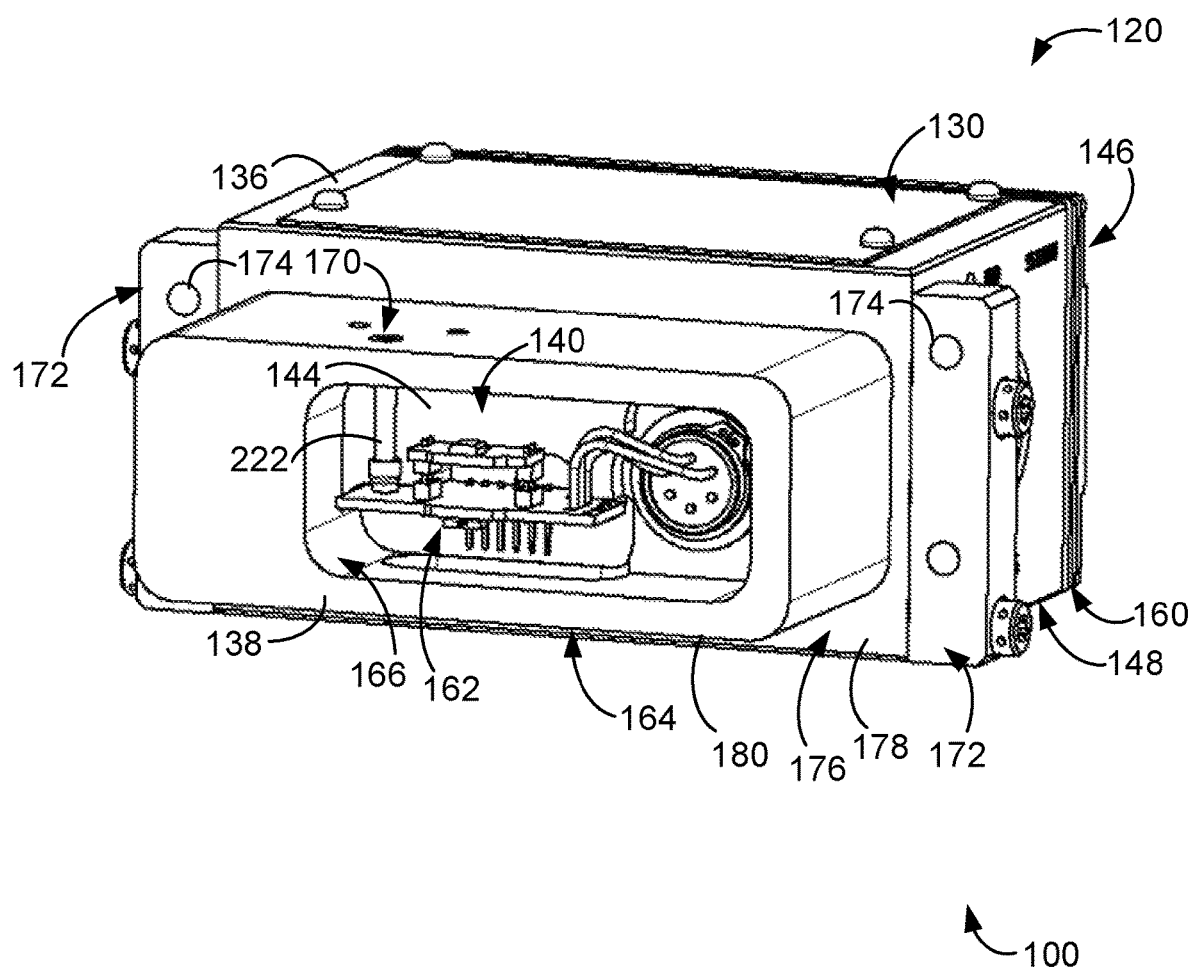
FIG. 4 is a bottom perspective view of the explosion-proof encoder shown in FIG. 3.

FIGS. 1 and 2 show of an example position sensor system 100. The position sensor system 100 includes a rotor assembly 110 and an explosion-proof encoder 120. FIGS. 3 and 4 show the encoder 120. While examples are described herein for use with a rotor assembly 110, the explosion-proof encoder 120 may be used with any device monitorable using one or more sensors.

The rotor assembly 110 includes a rotor 122 and a shaft 124 extending axially from the rotor 122. In some examples, the rotor assembly 110 is coupled to and driven by a motor (not shown). The rotor 122 and shaft 124 are configured to rotate about an axis of rotation 126 (shown in FIG. 2) extending through an axial center of the rotor 122 and shaft 124.

The rotor 122, for example, may be magnetized at one or more locations along its peripheral surface 128 to enable the rotor assembly 110 to be monitored (e.g., by the encoder 120). In some examples, the magnetized surfaces include an incremental or "INC" track configured to provide a predetermined number of pulses proportional to a revolution of the rotor 110 and/or an absolute or "Z" track configured to provide one index pulse per revolution. Alternatively, a magnetized location may be at any other surface of the rotor assembly 110 that enables the position sensor system 100 to function as described herein.

As shown in FIG. 3, the encoder 120 includes a housing 130 defining a first zone 132 and a second zone 134. The housing 130 may include, for example, a plurality of sidewalls including a first set of one or more sidewalls 136 defining the first zone 132 and a second set of one or more sidewalls 138 defining the second zone 134. A single sidewall (e.g., a cylindrical sidewall) may include a first set of one sidewall 136 and a second set of one sidewall 138 in that the first set of one sidewall 136 may be a first portion of the single sidewall that defines the first zone 132 and the second set of one sidewall 138 may be a second portion of the single sidewall that defines the second zone 134. In some examples, the housing 130 includes a protection partition 140 having a first surface 142 oriented toward the first zone 132 and a second surface 144 oriented toward the second zone 134. The protection partition 140 may extend, for example, laterally across a cavity defined by the housing 130 between opposing sidewalls (e.g., left wall and right wall, front wall and rear wall). In some examples, the first set of sidewalls 136 and/or protection partition 140 are configured to withstand internal ignition and contain explosion the explosion in the first zone 132.

In some examples, the encoder 120 includes a cover 146 coupleable to the housing 130 at an upper end portion 148 of the housing 130. The cover 146 may extend, for example, across a mouth defined by an upper portion of the first set of sidewalls 136. In some examples, the cover 146 seals and/or shields the first zone 132 from an ambient environment and/or the ambient environment from the first zone 132. One or more coupling mechanisms 150 (shown in FIGS. 1-3) may be used to secure the cover 146 to the first set of sidewalls 136. Example coupling mechanisms 150 may include, without limitation, a screw extending through an opening defined in the cover 146 and/or an opening defined in the housing 130, and the like.

As shown in FIG. 3, the cover 146 includes a head 152 and a shaft 154 extending from the head 152. In some examples, an upper portion of the shaft 154 defines a groove 156 extending about a perimeter of the shaft 154. The groove 156 may be sized, shaped, and/or configured to receive a sealing mechanism 158 that seals or fills a gap between the housing 130 and the cover 146. Example sealing mechanisms 158 may include, without limitation, a gasket, an O-ring, and the like. Additionally, a lower portion of the head 152 defines a rabbet 160 extending about a perimeter of the head 152. The rabbet 160 enables the cover 146 to be removably coupled to the housing 130. The rabbet 160 may be sized, shaped, and/or configured to receive an object for use in prying the cover 146 from the housing 130. Additionally, the rabbet 160 allows at least a portion of the cover 146 to be deformed without compromising an integrity of a flame path defined between the cover 146 and the housing 130. In this manner, the rabbet 160 may reduce a likelihood of physical damage to the cover 146 and/or housing 130 caused by mechanical impact (e.g., in an attempt to uncouple the cover 146 from the housing 130).

As shown in FIG. 4, the encoder 120 includes one or more sensors 162 coupleable to the housing 130 at a lower end portion 164 of the housing 130. The sensors 162 may be positioned, for example, in the second zone 134. In some examples, the sensors 162 are coupled to one or more inner surfaces 166 of the second set of sidewalls 138 and/or the second surface 144 of the protection partition 140

The sensors 162 are configured to detect an object, an activity of an object, and/or a parameter associated with the object. The lower end portion 164 may be positioned and/or oriented, for example, toward the rotor assembly 110 (shown in FIGS. 1 and 2) such that the sensors 162 are aligned with the peripheral surface 128 of the rotor 122. In this manner, the sensors 162 may detect one or more objects at the peripheral surface 128 (e.g., INC track, Z track) and output one or more signals or pulses corresponding to the detected objects.

The detected objects enable one or more parameters associated with the rotor assembly 110 to be identified. Example parameters may include, for example, a position, angle, movement direction, and/or movement amount. In some examples, the sensors 162 are or include one or more interdigitated magnetoresistive sensor elements that provide single ended two phase or differential outputs. For example, the sensors 162 may provide one or more incremental electrical pulse output signals (e.g., "A," "B," "A Quad B") indicating an incremental rotation in response to magnetic patterns associated with the INC track and/or one or more index electrical pulse output signals (e.g., "Z") in response to magnetic patterns associated with the Z track. Alternatively, the sensors 162 may include a Hall effect sensor, an optical sensor, and/or any other sensor device that enables the position sensor system 100 to function as described herein.

As shown in FIGS. 2 and 3, the encoder 120 includes one or more cable ports 168. A cable port 168 may be defined, for example, in in one of the first set of sidewalls 136 to provide access to the first zone 132. The cable ports 168 may be sized, shaped, and/or configured to receive one or more wirings or cables (not shown) therethrough. In some examples, a cable port 168 provides access to a cavity defined in the housing 130. The cable ports 168 enable the position sensor system 100 to communicate with one or more external devices (e.g., control system). The parameters associated with the rotor assembly 110, for example, may be communicated with a control system.

As shown in FIGS. 1 and 4, the encoder 120 includes one or more diagnostic indicators 170 that identify a functionality of the position sensor system 100 and present one or more indications corresponding to the identified functionality. The diagnostic indicators 170 may include, for example, one or more light emitting diodes (LEDs). The diagnostic indicators 170 may be programmed to indicate, for example, one or more wiring errors including a short circuit, misconnection (e.g., leaving an output signal unconnected), application of reverse power, and/or application of power to an output signal connection. In some examples, the encoder 120 includes one or more line driver and/or wiring protection circuits that prevent or reduce a likelihood of damage from short circuits, application of reverse power, and/or application of power to an output signal connection.

In some examples, the encoder 120 includes one or more mounting mechanisms 172 (shown in FIGS. 1-3) that enable the encoder 120 to be mounted on an external surface (e.g., a surface of another device). The mounting mechanisms 172 may provide a plurality of mounting options for application in a diversity of machines. The mounting mechanisms 172 may be or include, for example, one or more tabs extending from an outer surface of the encoder 120 and including one or more openings 174 (shown in FIGS. 1 and 3) sized, shaped, and/or configured to receive one or more coupling mechanisms (e.g., pins, screws) for coupling the encoder 120 to another device. As shown in FIG. 2, the mounting mechanisms 172 is positionable in a nook 176 defined by a lower surface 178 of one of the first set of sidewalls 136 and a rear surface 180 of one of the second set of sidewalls 138.

Figure 5:
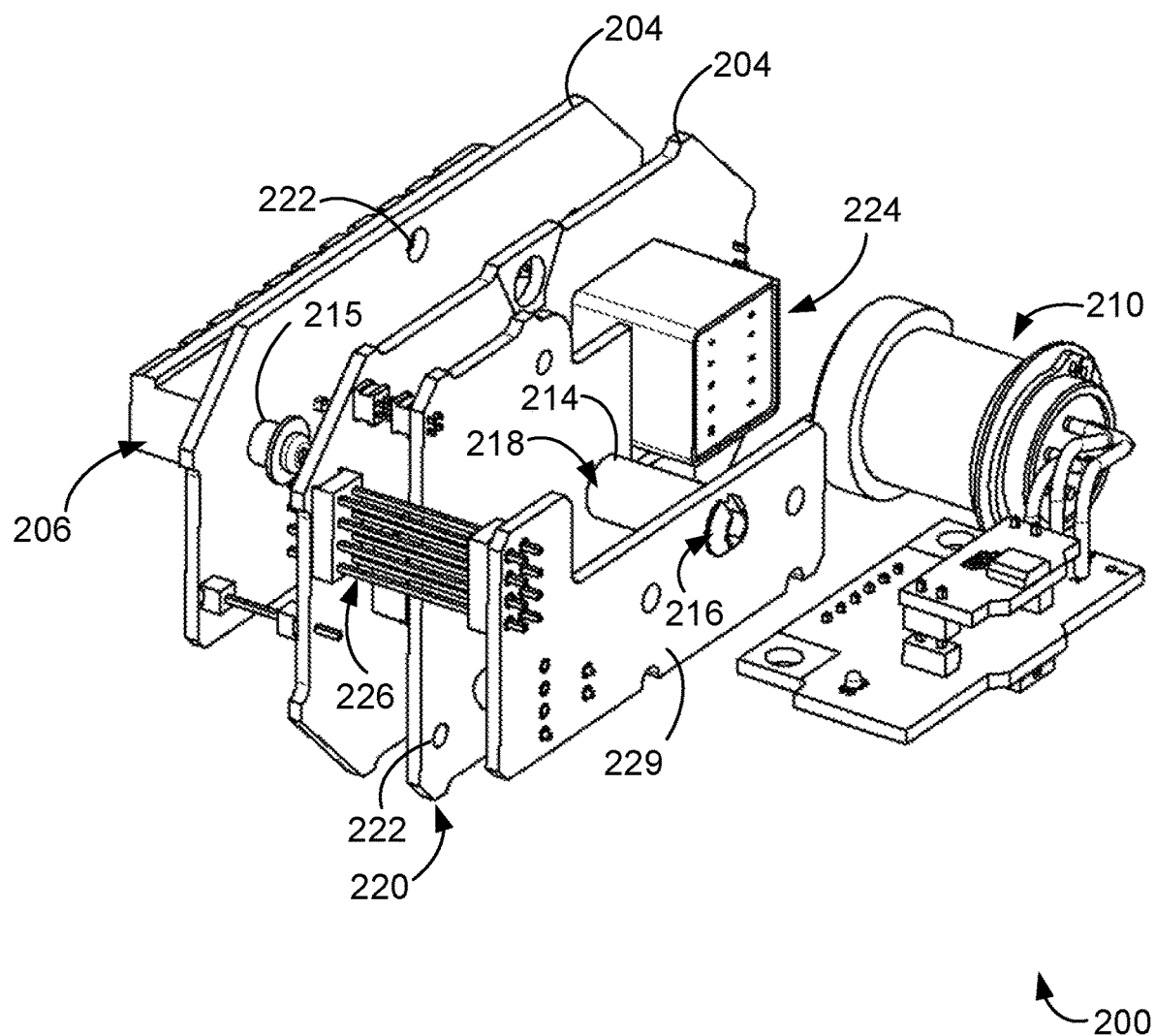
FIG. 5 is a perspective view of an example board stack assembly that may be housed in an encoder, such as the explosion-proof encoder shown in FIG. 3.
Figure 6:
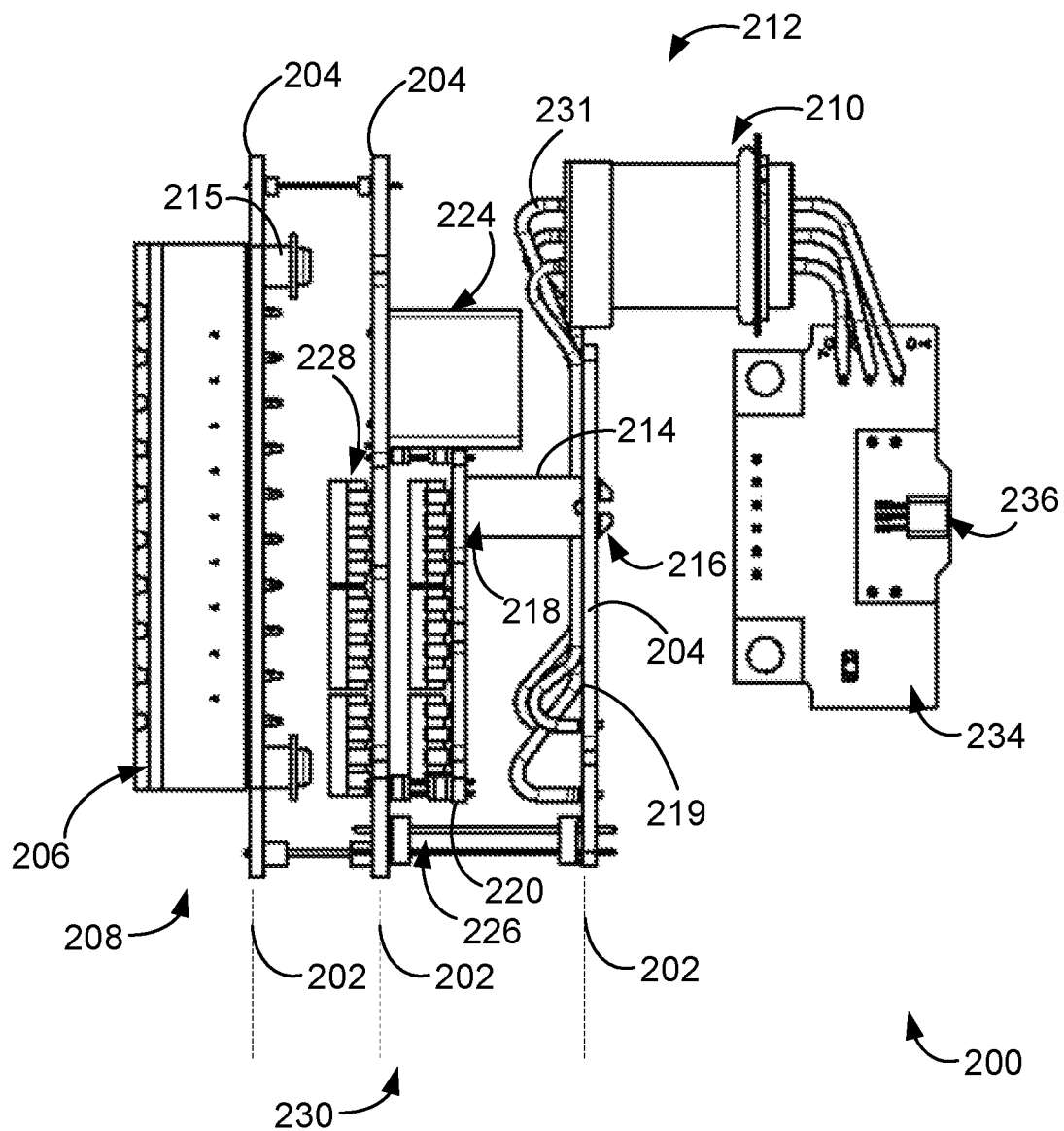
FIG. 6 is a top view of the board stack assembly shown in FIG. 5.

FIGS. 5 and 6 show an example board stack assembly 200 that may be housed in the housing 130. The board stack assembly 200 has a plurality of elevations 202 (shown in FIG. 6) that enable the board stack assembly 200 to have a smaller footprint. The board stack assembly 200 may include, for example, one or more printed circuit boards (PCBs) 204 and one or more electronic components coupled to the PCBs 204 that are sized, shaped, and/or oriented to fit in the first zone 132 (shown in FIG. 3).

In some examples, the board stack assembly 200 includes an integrated interface device 206 at a first elevation 208 (shown in FIG. 6), a protective wire feedthrough 210 at a second elevation 212 (shown in FIG. 6), and one or more support mechanisms 214 extending between the first elevation 208 and the second elevation 212. The interface device 206 may be, for example, a terminal block coupleable to one or more external components. In some examples, the board stack assembly 200 includes one or more embedded anchors or supports 215 opposite the interface device 206 that provide structural support to the interface device 206. The supports 215 may be cast, potted, and/or encapsulated, for example.

The protective wire feedthrough 210 couples one or more elements in the first zone 132 with one or more elements in the second zone 134. In some examples, the protective wire feedthrough 210 has a smooth wall that enables the protective wire feedthrough 210 to be slid through the sensor opening when assembling the encoder 120. The protective wire feedthrough 210 may be or include, for example, a line bushing and/or firestop configured to seal a sensor opening defined through the protection partition 140 such that the first zone 132 and second zone 134 are generally shielded from each other. In some examples, the board stack assembly 200 is assembled as a module with the interface device 206 to facilitate assembly of the encoder 120.

The support mechanisms 214 are configured to provide structural support to the PCBs 204 and/or electronic components (e.g., interface device 206, protective wire feedthrough 210). A support mechanism 214 may include a first end portion 216 anchored to the housing 130 (shown in FIGS. 1-4), for example, and a second end portion 218 coupled to a PCB cartridge 220. In some examples, a PCB 204 includes one or more mounting openings 222 (shown in FIG. 5) that enable one or more coupling mechanisms (e.g., a standoff, a spacer) to extend therethrough for mounting to an inner surface of the housing 130 (e.g., an inner surface of the first set of sidewalls 136). The support mechanisms 214 may be enveloped within a casting, potting, or encapsulating compound.

The board stack assembly 200 also includes a transformer 224, a one-wire communication interface 226, and an energy-limiting apparatus 228 (shown in FIG. 6) configured to isolate the one-wire communication interface 226 from the transformer 224. The energy-limiting apparatus 228 forms a barrier between an intrinsically-safe portion of the board stack assembly 200 and the rest of the board stack assembly 200. The energy-limiting apparatus 228 may be, for example, an optical isolator, a galvanic isolator, a Zener barrier, and the like. An amount of electrical energy transmitted into or stored in a potentially hazardous environment (e.g., electrical energy transmitted to or stored at a sensor 162) may be restricted, for example, by the energy-limiting apparatus 228. In some examples, an external power supply is coupled to the board stack assembly 200 (e.g., via the interface device 206), and the energy-limiting apparatus 228 limits an amount of energy transmitted to the protective wire feedthrough 210, which is insulated and protected. In this manner, one or more electronic components coupled to the one-wire communication interface 226 may receive a controlled, intrinsically-safe amount of power. The one-wire communication interface 226 may extend, for example, through the protective wire feedthrough 210.

In some examples, the one-wire communication interface 226 uses a single data line plus ground reference for bidirectional communication. The one-wire communication interface 226 enables one or more electronic components (e.g., sensor 162) coupled to the one-wire communication interface 226 to operate over a controlled transformer at a predetermined voltage rate.

A power source may provide an ultra-wide range of electrical energy, and the energy-limiting apparatus 228 provides a high degree of electrical isolation between the hazardous sections (e.g., at sensor 162 or protective wire feedthrough 210) and non-hazardous sections of circuitry (e.g., at another electrical component coupled to the board stack assembly 200). In some examples, the energy-limiting apparatus 228 reduces a need for a high integrity earth ground. An interconnect board (ICB) 229 coupled to the transformer 224 and/or energy-limiting apparatus 228 may be at a third elevation 230 (shown in FIG. 6) different from the first elevation 208 and/or second elevation 212. The ICB 229 is, includes, or is coupled to a wire management device physically separating a non-protected portion of the board stack assembly 200 from a protected portion of the board stack assembly 200. In some examples, the ICB 229 is coupled to one or more wirings 231 (shown in FIG. 6) that are spaced from one or more electronic components that are at an elevation other than that of the ICB 229 (e.g., interface device 206, transformer 224). The wirings 231 may be anchored, for example, to facilitate maintaining a position and/or orientation of the wirings 231.

The board stack assembly 200 may be positioned in the encoder 120 with the interface device 206 at or adjacent to a port (e.g., cable port 168) and the protective wire feedthrough 210 at or adjacent to another port (e.g., a sensor opening defined through the protection partition 140). The protective wire feedthrough 210 allows the board stack assembly 200 to be built or assembled within a blind cavity while maintaining intrinsic safety spacing. The protective wire feedthrough 210 is coupleable, for example, to one or more sensors 162. In some examples, the protective wire feedthrough 210 extends through a sensor opening defined by the protection partition 140 such that a first portion of the protective wire feedthrough 210 is in the first zone 132 and a second portion of the protective wire feedthrough 210 extends between the first zone 132 and the second zone 134

(shown in FIG. 3). The sensor opening enables the protective wire feedthrough 210 to be coupled to one or more sensors 162 in the second zone 134.

Figure 7:
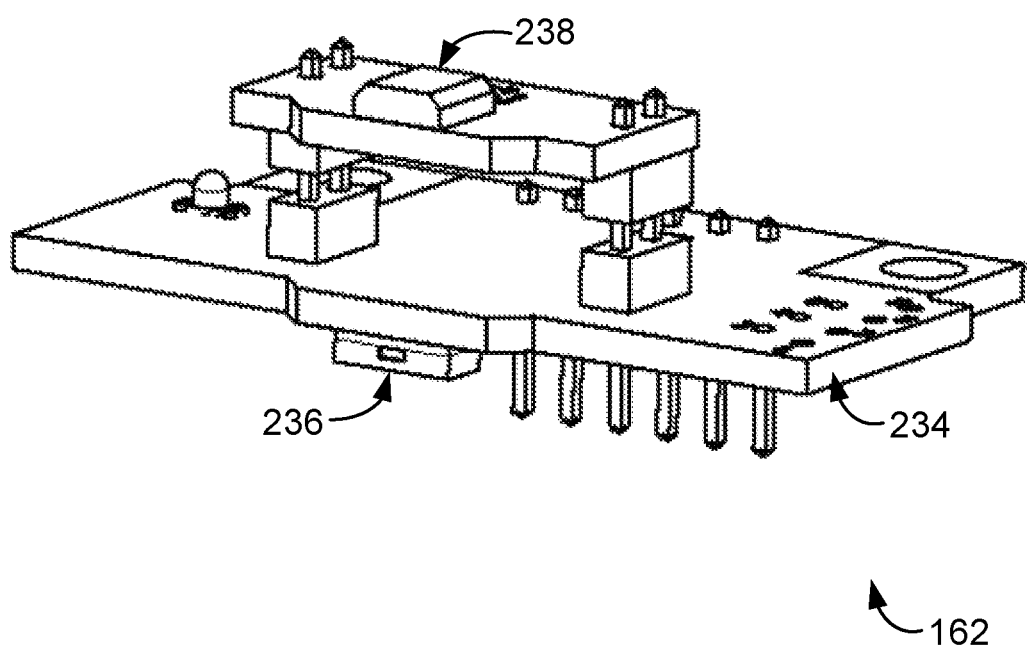
FIG. 7 is a perspective view of an example sensor device that may be used with a position sensor system, such as the position sensor system shown in FIG. 1, an encoder, such as the explosion-proof encoder shown in FIG. 3, or a board stack assembly, such as the board stack assembly shown in FIG. 5.

As shown in FIG. 7, the sensors 162 are a sensor stack assembly having a plurality of elevations 232 that enable one or more PCBs 234 and one or more electronic components coupled to the PCBs 234 to fit in the second zone 134 (shown in FIG. 3). In some examples, the sensors 162 include a first sensor 236 positioned and/or oriented to detect an INC track or Z track at the peripheral surface 128 of the rotor 122 (shown in FIGS. 1 and 2), and a second sensor 238 (shown in FIG. 7) positioned and/or oriented to detect the other of the INC track or Z track. Alternatively, the sensors 162 may include any type of sensor (e.g., optical, magnetic, Hall effect) that enables the encoder 120 to function as described herein. The first sensor 236 and/or second sensor 238 may communicate with one or more electronic components coupled to the board stack assembly PCB 204, for example, via protective wire feedthrough 210.

In some examples, the sensor stack assembly includes one or more light pipes 240 (shown in FIG. 4) extending between an LED (e.g., diagnostic indicator 170) at the PCB 234 and one of the second set of sidewalls 138. The diagnostic indicators 170 may identify, for example, a functionality of the sensor stack assembly and present one or more indications corresponding to the identified functionality. In this manner, a user may visibly identify a functionality of the board stack assembly 200 and/or sensor stack assembly at an outer surface of the housing 130.

Figure 8:
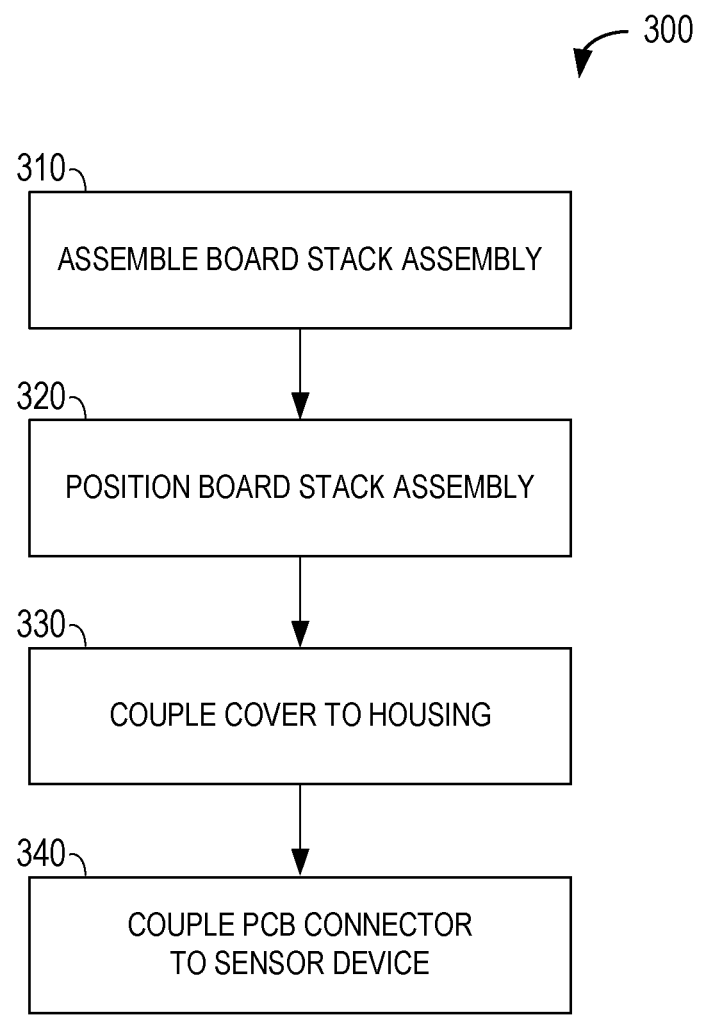
FIG. 8 is a flowchart of an example method of providing an intrinsically safe, explosion-proof encoder for use with one or more sensor devices.

FIG. 8 shows operations of a method 300 of providing an intrinsically-safe encoder (e.g., encoder 120) that may be used with one or more sensor devices (e.g., sensor 162). The method 300 includes assembling a board stack assembly 200 at operation 310. The board stack assembly 200 is assembled, for example, to include an interface device 206 and a protective wire feedthrough 210 at a plurality of elevations (e.g., elevations 208 and 212, respectively).

The board stack assembly 200 is positioned at operation 320 such that the interface device 206 and a first portion of the protective wire feedthrough 210 are in a first zone 132 defined by a housing 130 of an explosion-proof encoder 120 and a second portion of the protective wire feedthrough 210 extends between the first zone 132 and a second zone 134 defined by the housing 130 of the explosion-proof encoder 120. In some examples, the housing 130 includes a first set of sidewalls 136 defining the first zone 132, a second set of sidewalls 138 defining the second zone 134, and an integrated protection partition 140 delineating the first zone 132 from the second zone 134.

A cover 146 is coupled to the housing 130 at operation 330 such that the cover 146 seals the first zone 132 from an ambient environment. In some examples, the cover 146 is positioned in a mouth defined by the first set of sidewalls 136 to couple the cover 146 to the housing 130. The mouth may be in fluid communication with the first zone 132, for example. In some examples, a coupling mechanism 150 securely couples the cover 146 to the housing 130.

The protective wire feedthrough 210 is coupled to one or more sensors 162 in the second zone 134 at operation 340. In some examples, the protection partition 140 has a sensor opening defined therethrough between the first zone 132 and the second zone 134 that enables the protective wire feedthrough 210 to be coupled to the sensors in the second zone 134. That is, the protective wire feedthrough 210 may extend through the sensor opening such that a first portion of the protective wire feedthrough 210 is in the first zone 132 and a second portion of the protective wire feedthrough 210 extends through the sensor opening between the first zone 132 and the second zone 134.

A one-wire communication interface 226 and an energy-limiting apparatus 228 enable a transformer 224 to provide power limited signals transmittable outside the housing 130 to communicate with the sensors in an intrinsically-safe manner That is, the sensors 162 are connected to the transformer 224 and receiver electronics (e.g., encoder 120) by low-impedance, noise-immune connections through an explosion-proof interface. For example, the transformer 224 may transmit 40 milliamps (mA) to and receive "A" and "B" signals from an incremental sensor and/or transmit 20 mA to and receive a "Z" signal from an index sensor via the one-wire communication interface 226. The one-wire communication interface 226 is insulated.

In some examples, the first set of sidewalls 136 includes a plurality of cable ports 168 defined therethrough. The cable ports 168 are in fluid communication with the first zone 132, for example. In some examples, the cable ports 168 include a first opening defined in a first wall of the first set of sidewalls 136 and a second opening defined in a second wall of the first set of sidewalls 136 opposite the first wall.

The one-wire communication interface 226 and energy-limiting apparatus 228 enable the encoder 120 to communicate with one or more external devices (e.g., control system) via one or more wirings extending through the cable ports 168 in an intrinsically-safe manner. In some examples, one or more diagnostic indicators 170 are configured to identify a functionality of the board stack assembly 200 and present one or more indications corresponding to the identified functionality. The diagnostic indicators 170 may include, for example, one or more light emitting diodes (LEDs) coupled to the board stack assembly 200.

In some examples, the line bushing 210 is electrically connected to the board stack assembly 200 while it is being constructed outside of housing 130. This assembly is inserted into the housing 130. The one-wire communication interface 226 extends through the line bushing 210 and/or protective barrier 140 until a flange of the line bushing 210 comes to rest against the protective barrier 140 and is secured with a retaining devise (e.g., a snap ring) on the far side. The conductors may be soldered to the sensor PCB stack 162 outside of the housing. Then, the sensor stack assembly is secured to the housing 130 in second zone 134.

The examples described herein include a housing and a protection partition separating a cavity defined by the housing into a first, controlled zone and a second zone exposed to an ambient environment. A printed circuit board (PCB) may be arranged or assembled in a stack to enable the electronic components to be housed in the first zone. The board stack assembly includes an integrated energy-limiting apparatus that provides intrinsic safety protection for one or more electronic components coupled to the board stack assembly, including one or more sensors with modular construction, without disrupting the first zone and/or without the need for extraneous wiring. Using a protection partition to separate the first zone from the second zone reduces a need for tight seals around a rotor and/or sensor, further rendering the examples described herein usable with sensors with modular construction. In this manner, the construction and protection methods and systems described herein are usable in hazardous environments with sensors with modular construction in an efficient, effective, and safe manner.

In some examples, the operations illustrated in the drawings may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. Furthermore, references to an "embodiment" or "example" of the present disclosure are not intended to be interpreted as excluding the existence of additional embodiments or examples that also incorporate the recited features. The terms "comprising," "including," and "having" are intended to be inclusive and mean that there may be additional elements other than the listed elements. The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the aspects of the disclosure have been described in terms of various examples with their associated operations, a person skilled in the art would appreciate that a combination of operations from any number of different examples is also within the scope of the aspects of the disclosure.

What is claimed is:

1. An intrinsically-safe, explosion-proof encoder comprising:
    a housing including a plurality of sidewalls and a protection partition, the plurality of sidewalls including a first set of one or more sidewalls defining a first zone and a second set of one or more sidewalls defining a second zone exposed to an ambient environment, the protection partition having a first surface oriented toward the first zone and a second surface oriented toward the second zone, the protection partition having an opening defined therethrough between the first zone and the second zone;
    a board stack assembly including one or more printed circuit boards and an interface device, an energy-limiting apparatus, and a protective wire feedthrough coupled to the one or more printed circuit boards in the first zone, the protective wire feedthrough extending through the opening between the first zone and the second zone;
    a sensor device coupled to the protective wire feedthrough in the second zone; and
    a cover configured to engage the first set of one or more sidewalls such that the cover seals the first zone from the ambient environment.

2. The intrinsically-safe, explosion-proof encoder of claim 1, wherein the board stack assembly includes a transformer and a one-wire communication interface coupled to the one or more printed circuit boards in the first zone, wherein the energy-limiting apparatus is configured to galvanically isolate the one-wire communication interface from the transformer.

3. The intrinsically-safe, explosion-proof encoder of claim 1, wherein the board stack assembly includes a support mechanism coupled to the one or more printed circuit boards in the first zone, the support mechanism extending between a first elevation of a plurality of elevations and a second elevation of the plurality of elevations.

4. The intrinsically-safe, explosion-proof encoder of claim 1 further comprising a diagnostic indicator coupled to the protective wire feedthrough in the second zone, the diagnostic indicator configured to identify a functionality of the board stack assembly and present one or more indications corresponding to the identified functionality.

5. The intrinsically-safe, explosion-proof encoder of claim 1, wherein the first set of one or more sidewalls define a mouth in fluid communication with the first zone, and the cover includes a shaft positionable in the mouth to couple the cover to the first set of one or more sidewalls.

6. The intrinsically-safe, explosion-proof encoder of claim 1 further comprising a sealing mechanism, wherein the cover includes a head and a shaft extending from the head, an upper portion of the shaft defining a groove configured to receive the sealing mechanism.

7. The intrinsically-safe, explosion-proof encoder of claim 1, wherein the cover includes a head and a shaft extending from the head, a lower portion of the head defining a rabbet extending about a perimeter of the head.

8. The intrinsically-safe, explosion-proof encoder of claim 1 further comprising a coupling mechanism coupling the cover to the first set of one or more sidewalls.

9. The intrinsically-safe, explosion-proof encoder of claim 1, wherein the first set of one or more sidewalls include a plurality of openings defined therethrough, the plurality of openings in fluid communication with the first zone, the plurality of openings including a first opening defined in a first wall of the first set of one or more sidewalls and a second opening defined in a second wall of the first set of one or more sidewalls opposite the first wall.

10. The intrinsically-safe, explosion-proof encoder of claim 1 further comprising a mounting mechanism coupleable to an external surface.

11. A position sensor system comprising:
    a position sensor; and
    an encoder communicatively coupleable to the position sensor, the encoder including a housing defining a first zone and a second zone exposed to an ambient environment, a board stack assembly in the first zone, and a cover configured to seal the first zone from the ambient environment, the board stack assembly having a plurality of elevations including one or more printed circuit boards and an interface device, an energy-limiting apparatus, and a protective wire feedthrough coupled to the one or more printed circuit boards in the first zone, the protective wire feedthrough coupled to the position sensor in the second zone.

12. The position sensor system of claim 11, wherein the housing includes a first set of one or more sidewalls defining the first zone, a second set of one or more sidewalls defining the second zone, and a protection partition having a first surface oriented toward the first zone and a second surface oriented toward the second zone.

13. The position sensor system of claim 11, wherein the board stack assembly includes the interface device at a first elevation of the plurality of elevations, the protective wire feedthrough at a second elevation of the plurality of elevations, and a support mechanism extending between the first elevation and the second elevation.

14. The position sensor system of claim 11, wherein the board stack assembly includes a transformer and a one-wire communication interface, wherein the energy-limiting apparatus is configured to galvanically isolate the one-wire communication interface from the transformer.

15. The position sensor system of claim 11, wherein the encoder includes a diagnostic indicator coupled to the protective wire feedthrough in the second zone, the diagnostic indicator configured to identify a functionality of the board stack assembly and present one or more indications corresponding to the identified functionality.

16. The position sensor system of claim 11, wherein the encoder includes a sealing mechanism and a coupling mechanism coupling the cover to the housing, the cover including a head and a shaft extending from the head, a lower portion of the head defining a rabbet extending about a perimeter of the head, an upper portion of the shaft defining a groove configured to receive the sealing mechanism.

17. The position sensor system of claim 11, wherein the encoder includes one or more openings defined therein, the one or more openings in fluid communication with the first zone.

18. The position sensor system of claim 11, wherein the encoder includes a mounting mechanism coupleable to an external surface.

19. A method of providing an intrinsically-safe encoder for use with one or more sensor devices, the method comprising:
assembling a board stack assembly including one or more printed circuit boards and an interface device, an energy-limiting apparatus, and a protective wire feedthrough coupled to the one or more printed circuit boards;
positioning the board stack assembly such that the interface device, the energy-limiting apparatus, and the protective wire feedthrough are coupled to the one or more printed circuit boards in a first zone defined by a housing and the protective wire feedthrough extends between the first zone and a second zone exposed to an ambient environment, the housing including a protection partition delineating the first zone from the second zone;
coupling a cover to the housing such that the cover seals the first zone from the ambient environment; and
coupling the protective wire feedthrough to the one or more sensor devices in the second zone.

* * * * *